United States Patent [19]

Leung

[11] Patent Number: 4,924,216
[45] Date of Patent: May 8, 1990

[54] JOYSTICK CONTROLLER APPARATUS

[75] Inventor: Albert M. Leung, Burnaby, Canada

[73] Assignee: Acemore International Ltd., Lemoyne, Pa.

[21] Appl. No.: 155,669

[22] Filed: Feb. 12, 1988

[51] Int. Cl.⁵ ............................................. G09G 3/02
[52] U.S. Cl. ................................. 340/709; 273/148 B
[58] Field of Search ............... 340/706, 709; 250/221; 273/148 B; 74/471 R, 471 XY; 439/65, 404, 620

[56] References Cited

U.S. PATENT DOCUMENTS

| | | |
|---|---|---|
| Re. 28,507 | 8/1975 | Rusch . |
| Re. 28,598 | 10/1975 | Baer et al. . |
| 3,432,846 | 3/1969 | Jones et al. . |
| 3,829,095 | 8/1974 | Baer . |
| 3,838,856 | 10/1974 | Takeya et al. . |
| 3,847,396 | 11/1974 | Ashford . |
| 3,874,669 | 4/1975 | Ariano et al. . |
| 3,918,714 | 11/1975 | Ceccaroni . |
| 3,963,300 | 6/1976 | Patton et al. . |
| 4,026,555 | 5/1977 | Kirschner et al. . |
| 4,034,990 | 7/1977 | Baer . |
| 4,045,777 | 8/1977 | Mierzwinski et al. . |
| 4,111,421 | 9/1978 | Mierzwinski . |
| 4,151,407 | 4/1979 | McBride et al. . |
| 4,156,134 | 5/1979 | Minner . |
| 4,161,726 | 7/1979 | Burson et al. . |
| 4,195,422 | 4/1980 | Budmiger . |
| 4,236,779 | 12/1980 | Tang . |
| 4,239,320 | 12/1980 | Hesse et al. . |
| 4,313,227 | 1/1982 | Eder ..................................... 340/709 |
| 4,352,492 | 10/1982 | Smith . |
| 4,382,166 | 5/1983 | Kim ..................................... 340/709 |
| 4,426,738 | 1/1984 | Sato ..................................... 455/603 |
| 4,484,791 | 11/1984 | Johnson ............................. 439/404 |
| 4,531,740 | 7/1985 | Green et al. ..................... 273/148 B |
| 4,550,250 | 10/1985 | Mueller et al. ...................... 250/221 |
| 4,565,999 | 1/1986 | King et al. ......................... 340/706 |
| 4,578,674 | 3/1986 | Baker et al. ........................ 340/710 |
| 4,588,187 | 5/1986 | Dell ................................. 273/148 B |
| 4,603,320 | 7/1986 | Farago ................................. 439/65 |
| 4,686,506 | 8/1987 | Farage ............................... 439/620 |
| 4,748,323 | 5/1988 | Holiday ............................. 250/221 |

Primary Examiner—Gerald Brigance
Assistant Examiner—Richard Hjerpe
Attorney, Agent, or Firm—Michael F. Petock

[57] ABSTRACT

Joystick controller apparatus in which a pair of joystick controllers may send signal bursts on the same communication channel in the infrared frequency range by means of an electromagnetic transmission without recognizable loss of data. An error checking system is also provided to eliminate the effects of noise. A universal cable connector is provided for connection to various video game apparatus.

18 Claims, 4 Drawing Sheets

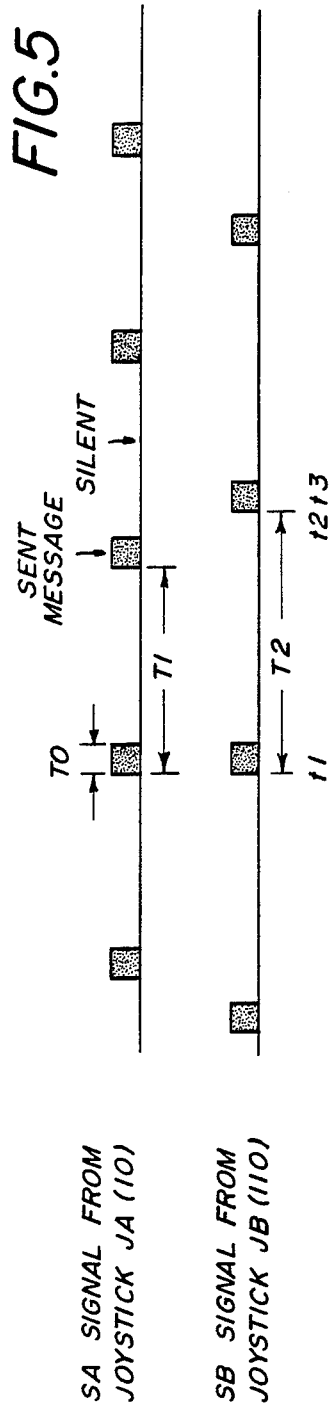
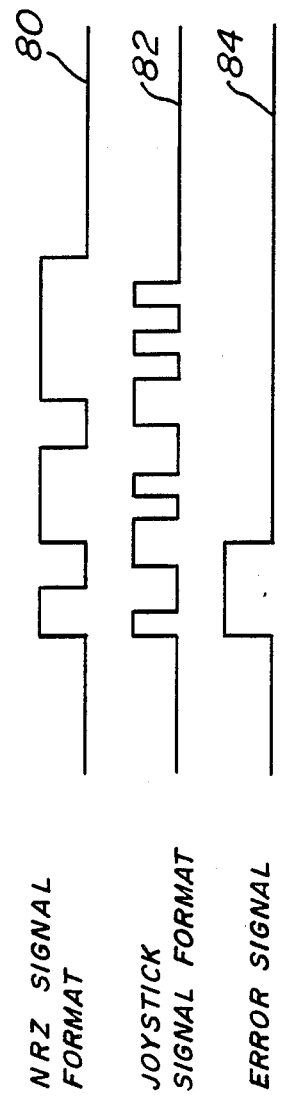
FIG.5
FIG.6

JOYSTICK CONTROLLER APPARATUS

BACKGROUND OF THE INVENTION

The present invention relates to joystick controller apparatus for use in playing video games.

Video games as played on video game apparatus such as Atari, Nintendo and Sega entertainment systems are currently widely utilized today for entertainment in the home and elsewhere. Presently, these games are operated by software programs. The game is played by operating switches on a hand-held device which is connected to the game apparatus by means of control wires. The video game apparatus is then connected to a monitor, and a conventionel television set is often utilized as the monitor.

Currently available apparatus requires the person playing the game or the operator to be physically connected to the game playing apparatus by wires. The wires present problems in that they limit the movement of the players and are subject to becoming tangled.

SUMMARY OF THE INVENTION

The present invention provides a joystick controller apparatus for video games wherein the joystick controller apparatus does not require wire connection to the game apparatus. In other words, the joystick controller apparatus of the present invention utilizes electromagnetic transmission to remotely control the video game apparatus.

Another advantage of the present invention is that two joystick manually operable control apparatus may be utilized simultaneously by two players utilizing a single transmission frequency.

Another advantage of the present invention is that the two manually operable joystock contoller apparatus may be utilized independently and simultaneously with the receiver being able to decode and identify the signals transmitted by each joystick controller.

A further advantage of the present invention is that there are no significant directional effects.

Another advantage of the present invention is that it is compatible with most home computers and currently available video game apparatus.

Briefly and basically, in accordance with the present invention, a joystick controller apparatus for video games and the like is provided. A first and second manually operable control apparatus is provided with each having a directionally operable switch means, such as a joystick, and at least one additional switch. Each manually operable control apparatus is provided with means for transmitting an electromagnetic signal in the infrared frequency range. This signal is modulated to include an address signal for each manually operable control apparatus and signal information from the directionally operable joystick and at least one additional switch. The additional switch is typically referred to as a firing or activate switch. More than one such firing switch may be provided on each manually operable control apparatus.

The modulated signal from each joystick controller apparatus has a duration of T0. The first manually operable control apparatus has a repetition period of T1. The second manually operable control apparatus has a repetition period of T2. T2 is selected to be at least two T0 greater than T1 and at least four times greater than T0 and is further selected to be less than 16.6 milliseconds.

Receiver means is provided for receiving the signals transmitted at the selected frequency in the infrared frequency range and means is provided for detecting the modulation on the signal. Decoder means is provided for decoding the first and second signals and separating them by address and providing separate control signals by means of wire connection to the video game apparatus.

BRIEF DESCRIPTION OF THE DRAWINGS

FIG. 5 shows the signals transmitted by a plurality of manually operable joystick control apparatus of the present invention.

FIG. 6 shows signals pertaining to an error checking system in accordance with the present invention.

DETAILED DESCRIPTION OF THE PREFERRED EMBODIMENTS

Figure 1:
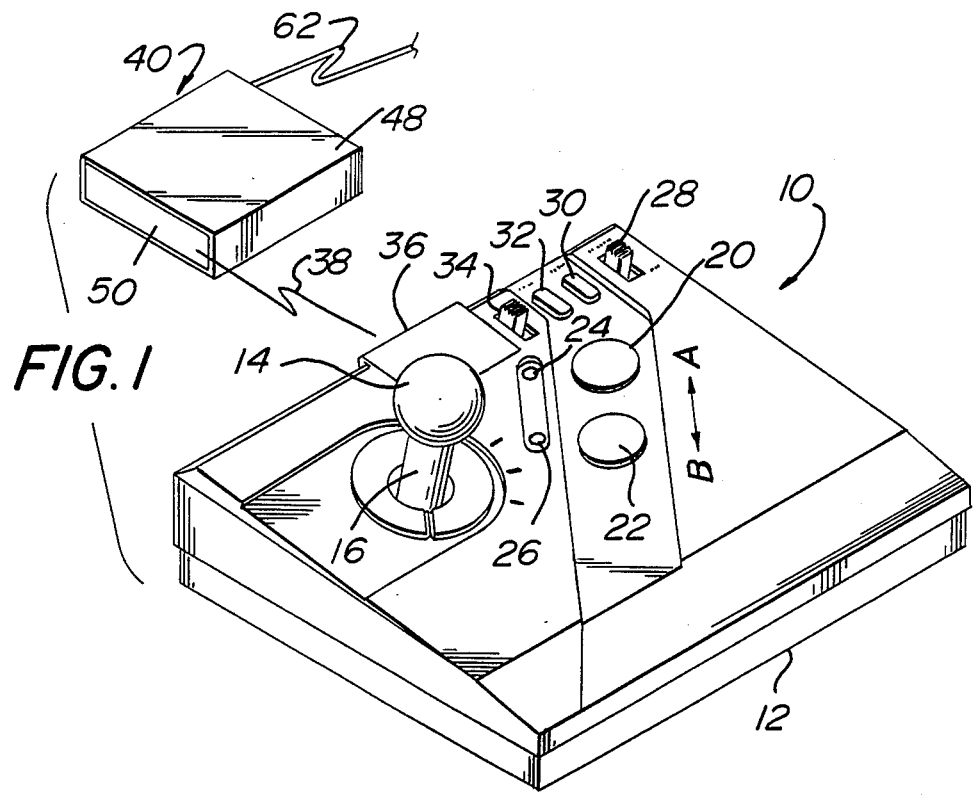
FIG. 1 shows a manually operable joystick control apparatus of the present invention.

Referring to the drawings in detail, wherein like numerals indicate like elements, there is shown in FIG. 1 a manually operable control apparatus sometimes referred to as a joystick controller 10. Joystick controller 10 is provided with a housing 12 which may be molded from any one of a number of suitable synthetic materials as are well known for such purposes. Additionally, housing 12 may be constructed of any other suitable relatively rigid material.

Mounted in housing 12 is a directionally operable switch means 14. Directionally operable switch means 14 is comprised of a stick member 16, often referred to as a joystick, pivotally mounted in housing 12 such that it may be pivoted to a limited degree in any 360° direction. Stick member 16 is conventionally referred to in the art as a joystick.

The operation of joystick 16, by pivoting it in a selected direction, operates one of four switches. These four switches as well as others are shown schematically in FIG. 3 at 18. Preferably, switches 18 may include additional switches, and in a preferred embodiment, eight switches are utilized. With respect to the four switches operated by pivoting joystick 16, one of the four switches is operated when joystick 16 is pivoted in a selected 90° segment of the 360° possible deflection of joystick 16.

Manually operable control apparatus or joystick controller 10 is provided with fire or activation switches 20 and 22, sometimes referred to as switches A and B, respectively. When fire or activation switches 20 and 22 are depressed, indicator lights 24 and 26, respectively, are energized to indicate their activation.

Joystick controller 10 is provided with a player switch 28 for selecting one or two players. Player switch 28 also functions as an on/off switch.

Switch button 30 may be activated as a selection switch button, a function that is required in the operation of many games. This select function is often required to select games of varying degrees of difficulty and the like. Switch button 32 is a "start" button which is a switch utilized to start the game. Switch 34 is provided to select an autofire or repetitive output signal for fire switches 20 and 22. In other words, with autofire on, a repetitive output in the relevant bit position is provided so long as switch 20 or 22 is depressed. The aforesaid switches as necessary are included in the switch contacts 18 shown schematically in FIG. 3.

Plastic cover 36 covers the transmitting antenna for joystick controller 10 which transmits a signal 38 to receiver means 40. The signal transmitted by the manually operable control apparatus or joystick controller from 36 is an electromagnetic signal in the infrared frequency range. Suitable transmitting elements such as infrared light emitting diodes are mounted behind transparent or translucent cover 36. The infrared light emitting diodes are shown schematically at 42 in FIG. 3.

Figure 3:
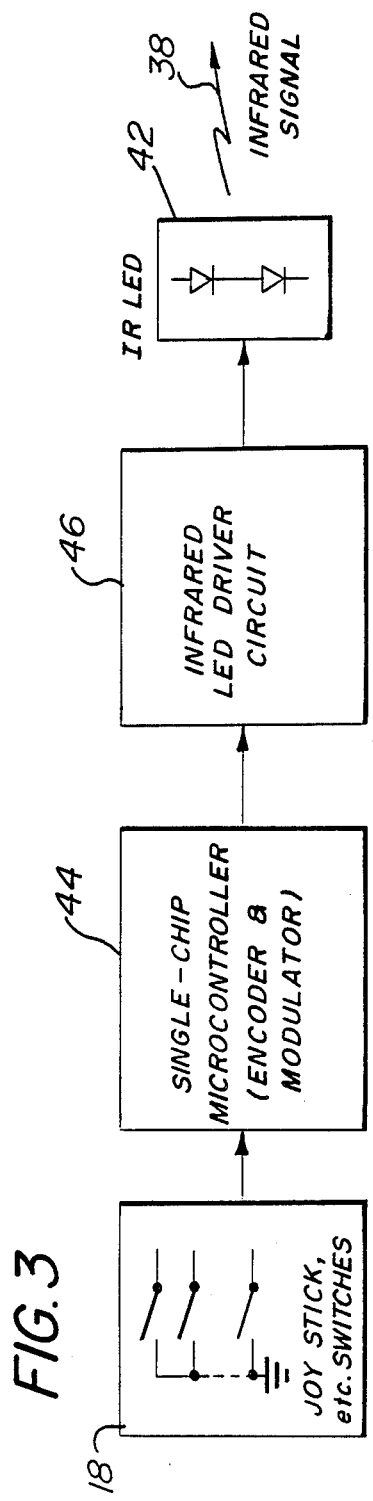
FIG. 3 shows a block diagram pertaining to the generation of an infrared signal in conjunction with a manually operable joystick control apparatus of the present invention.

As shown in FIG. 3, the switches on the manually operable control apparatus or joystick controller 10 are activated during game play. These switches 18 provide inputs to a single chip microcontroller which functions as an encoder and modulator. The single chip microcontroller 44 may be any suitable microcontroller chip such as a COP426C available from National Semiconductor Corp. located at 2900 Semiconductor Drive in Santa Clara, Calif. The output of the encoder and modulator 44 is fed to an infrared light emitting diode driver circuit 46. Such infrared light emitting driver circuits are commercially available. The output of the infrared light emitting driver circuit 46 is utilized to drive the infrared light emitting diodes 42 to generate the electromagnetic signal 38 in the infrared frequency range.

Figure 4:
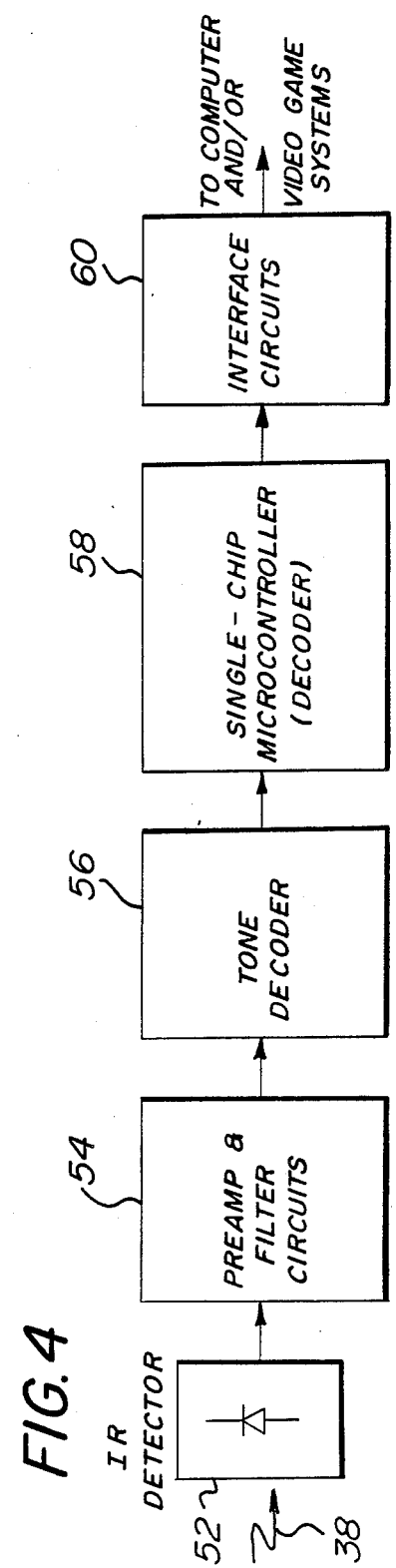
FIG. 4 shows a block diagram pertaining to the reception of the infrared signal for use with a computer and/or video game system in accordance with the present invention.

Receiver means 40 is provided with a housing 48 which may be molded from suitable synthetic material and is provided with a transparent or translucent cover 50 over the infrared detector 52. Infrared detector cover 50 may be constructed of translucent or transparent material similar to that of cover 36. The infrared detector 52 is shown schematically in FIG. 4. The output of the infrared detector 52 is fed to preamplifier and filter circuits 54 which amplify the signal from the infrared detector 52 and filter out noise as is well known in the art. The output of preamplifier and filter circuits 54 is fed to tone detector 56 which detects the tone modulation. The output of tone detector 56 is fed through a single chip microcontroller 58 which performs a decoder function. Single chip microcontroller 58 may be any suitable circuitry for performing the decoder function as more fully described hereinafter. A currently preferred microcontroller is available as a model number COP424C from National Semiconductor Corp. located at 2900 Semiconductor Drive, Santa Clara, Calif. The output of the decoder 58 is fed to interface circuits 60 which supply suitable level signals to the computer and/or video game systems via cable 62. The interface circuit 60 may include a pair of CD4021 integrated circuits to interface the receiver to the Nintendo entertainment system.

The frequency of transmission of the light emitting diodes 42 is selected to be in the infrared frequency range. Presently, the preferred modulation frequency is 40 KHz (kilohertz).

In a presently preferred embodiment, directional affects of the infrared transmitted joystick control system are substantially eliminated by adjusting the sensitivity of the receiver and/or the output of the transmitter such that reflected signals may be received when the system is utilized in a closed space, such as a room of a home or other building. In other words, even though the signal transmitted by transmitting element 42 of the joystick controller 10 is not directed at infrared detector 52 mounted behind cover 50, receiver 40 will still receive a detectable signal as reflected by the walls of the room or objects located within the room. In this manner, the joystick controller apparatus need not be pointed directly at the receiver to enable operation.

Figure 2:
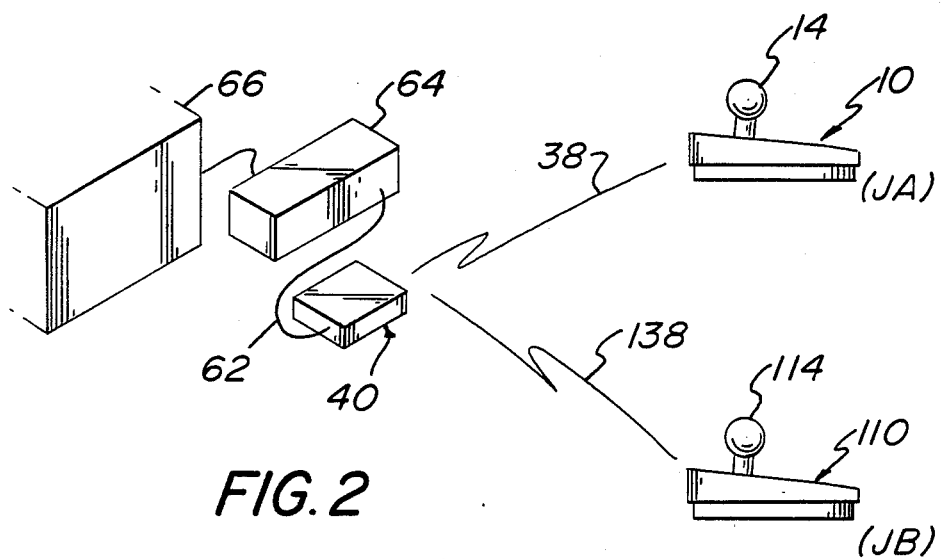
FIG. 2 shows an overall arrangement of the joystick controller apparatus of the present invention.

Referring now particularly to FIGS. 2, 5 and 6, there is shown in FIG. 2 an overall arrangement of the apparatus of the present invention wherein two joystick controllers 10 and 110 may be operated independently and simultaneously to transmit signals on the same infrared frequency, shown schematically as 38 and 138 to a receiver 40. The output of the infrared receiver 40 supplies signal to the computer or video game apparatus 64 which then supplies signal to a monitor or other display such as a television set 66. To aid in the explanation hereinafter, joystick controller 10 with directionally operable switch means 14 may sometimes be referred to as joystick A (indicated JA in the drawing) and joystick controller 110 with directionally operable switch means 114 may be indicated as joystick B (indicated as JB in the drawing).

The following is a description of a preferred embodiment of the present invention, but it will be understood by those skilled in the art that numerous variations and modification may be made within the spirit and teachings of the present invention.

The signals transmitted by each of the joystick controllers 10 and 110 is preferably comprised of an eight bit signal having a duration of T0. Each signal has a start bit, which is always a "1", a signal from fire button A 20, a signal from each of the four 90° quadrants of the directional switch 14, and an address signal which may be a "0" for joystick A and a "1" signal for joystick B and a signal for fire or activate switch B 22. As previously stated, the duration of this signal is a time period T0. Both joystick A and joystick B may preferably have substantially the same time duration, although this could be varied.

In order for the two joystick controllers 10 and 110 to share the same transmission frequency, and still be able to operate simultaneously and independently, a unique joystick controller system is utilized.

The signals transmitted by joystick A (JA) and joystick B (JB) are shown in FIG. 5. They are labeled as SA and SB. Both JA and JB transmit data in short message bursts which have a time duration of T0 as labeled in FIG. 5. The repetition period of the signal from joystick A has a duration of T1 as labeled in FIG. 5 and the duration of the signal from joystick B has a duration of T2 as labeled in FIG. 5. The transmission of each message is followed by a silent period of (T1-T0) for JA and (T2-T0) for JB. As illustrated, the repetition rates of data transmission are 1/T1 and 1/T2 for JA and JB, respectively.

Since SA and SB share the same carrier frequency in the infrared range, some interference between the two signals is unavoidable. When the two signals do coincide or interfere, the messages transmitted by both joystick A (10) and joystick B (110) are both lost. If T1 were selected equal to T2, this condition could continue for substantial periods of time in which the messages from both joystick controllers 10 and 110 would be inoperable.

In order to avoid this problem, in accordance with a preferred embodiment of the present invention, T2 has been selected to be equal to the following expression:

(1) T2=T1+2 (T0)

It is understood that other choices may be made within the spirit of the present invention including T2=T1+N (T0) where N is equal to a wide variety of values. However, with the aid of FIG. 5, it may be observed that at t1 messages transmitted by joystick controllers 10 and 110 coincide and no valid information is received. On the other hand, the next messages sent after this collision, at t2 for joystick controller 10 and at t3 for joystick controller 110, will always be free of interference from each other, as long as the condition given in formula (1) is valid. Because T1 and T2 are not equal and joystick controllers 10 and 110 operate independently, the time between collisions (TC) is given by:

$$(2) \quad TC = T2 \times \frac{T2}{(T2 - T1)}$$

Substituting formula (1) into formula (2), we obtain $$(3) \quad TC = T2 \times \frac{T2}{2(T0)}$$

If we choose
(4) T2 greater than 4 (T0)

then formula 3 becomes
(5) TC is greater than 2 (T2)

and
(6) TC is greater than 2 (T1)

because T2 is greater than T1 according to formula (1).

From formulas (5) and (6), it may be seen that at least one valid message is received for every two messages sent by each joystick, provided that the conditions given in formulas (1) and (4), as a minimum, are satisfied. This implies that joysticks 10 and 110 may share the same frequency as long as messages are sent at twice the minimum acceptable rate. As most monitors or television sets replace the display on the screen 30 times per second, it has been determined that a transmission rate of messages of 60 times per second produces results where no loss of control or information is perceptible to the user. In other words, as long as the repetition period of T2 is selected to be 16.6 milliseconds or less, the operator or user of the joystick controllers cannot perceive any loss of transmission of control or data. In other words, the information transmitted by the joystick controllers of the present invention is updated as quickly as new screens of information are updated on the monitor of the video game or computer.

Another advantage of the present invention is the inclusion of an error checking system which may be explained with reference to FIG. 6. As discussed earlier, in a presently preferred embodiment, the message sent during the period T0 from each joystick is preferably comprised of eight data bits. One being a start bit which is always a "1", a data bit for fire button A, four directional switches, which may be referred to as right, left, backward and forward, and an address data bit and a data bit for fire button B. For purposes of illustration in FIG. 6, there is shown on line 80 a non-return to zero signal format for the signal "10110111". This signal is comprised of a start bit, which is always a "1", and 7 data bits. The joystick signal format utilized in accordance with the present invention is shown at 82. The signal format utilized by the joystick controllers 10 and 110 of the present invention utilizes a transition at the center of each data bit to transmit the signal. In accordance with the preferred embodiment of the present invention, a logic "1" data bit is represented by a "1" to "0" transition at the center of the data bit and a logic "0" is represented by a "0" to "1" transition. However, it is understood that the circuitry may readily be programmed for an inversion of this code.

Since signals without a transition at the center of the data bit ("0" to "0" and "1" to "1") are invalid in this signal format, error detection is possible. For example, if a noise pulse illustrated at 84 in FIG. 6 is received, it is interpreted as a "11000000" message when non-return to zero signal format (trace 80) is used. On the other hand, this signal is recognized as an error when the joystick signal format of the present invention is used because of the absence of transitions at the center of data bits. This error checking system is incorporated into the present invention by means of circuitry well known in the art for the detection of the absence of transitions.

Figure 7:
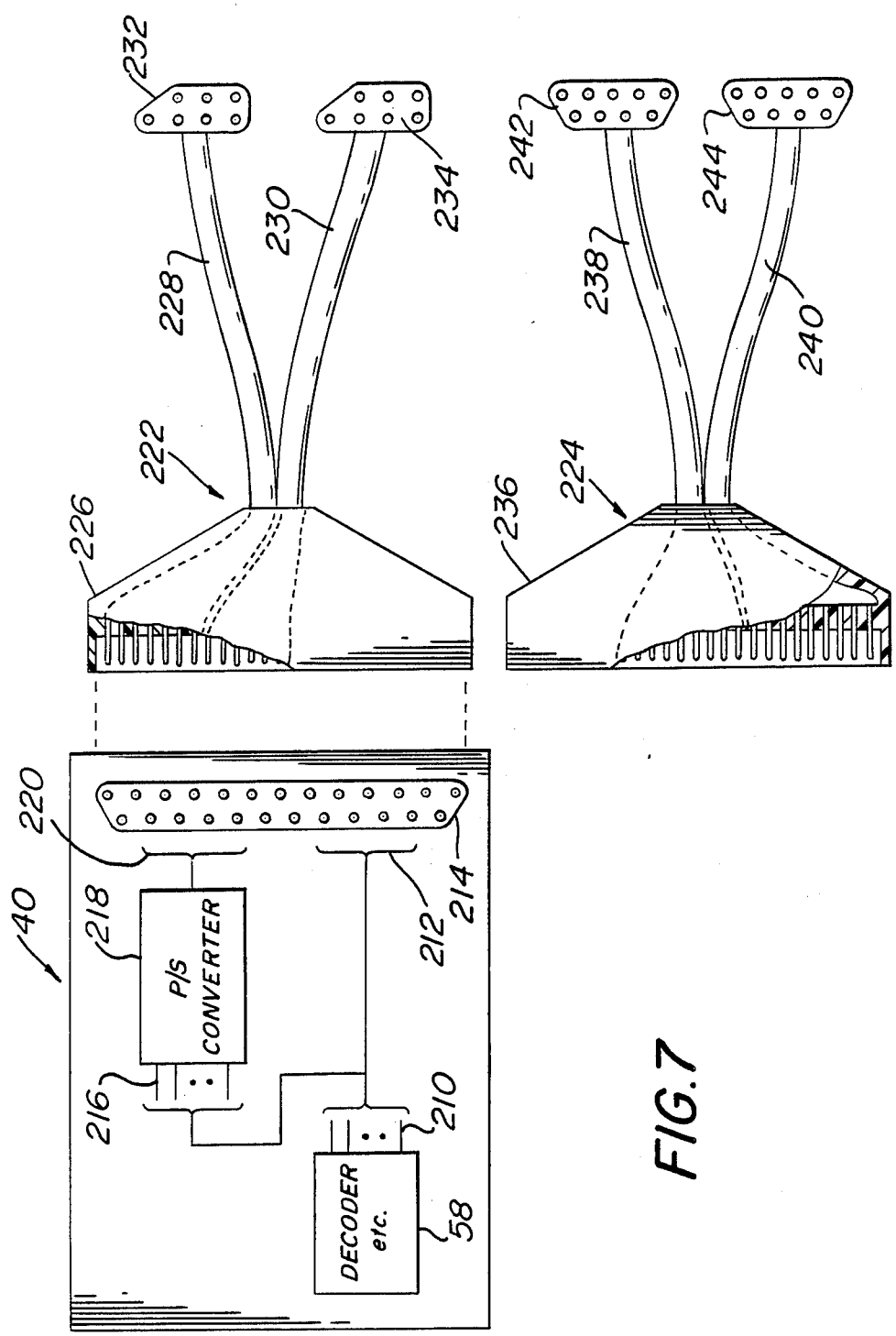
FIG. 7 shows an output connection system of a receiver in accordance with the present invention.

Referring now to FIG. 7, there is shown an output connection system of receiver 40 which may be utilized to connect the receiver 40 or, in general, any suitable joystick apparatus to various types of video games, such as Nintendo, Atari, Sega, Commodore and others. It is understood throughout that the reference to video games includes electronic apparatus which is dedicated solely for the playing of video games and personal computers and the like which may be utilized for the purpose of playing video games and for other purposes such as word processing.

Referring to FIG. 7, receiver 40 is shown, although it is understood that for the purposes of use of the connection system described in FIG. 7, receiver 40 could be a joystick which is adapted to be wired directly to any of the various video games. That is, not requiring the use of the remote control infrared transmission through air.

As illustrated in FIG. 7, the output of decoder 58 is in the form of a parallel output at 210. However, as described above, the parallel output circuitry 210 may be the output of various signal generating means such as joystick switches where the connection system described herein is used directly with a wire connected joystick not incorporating the remote infrared transmission system. The parallel outputs 210 may be fed directly to a plurality of parallel output connections 212 of a first connector 214. The parallel outputs 210 of decoder 58 also supply parallel input 216 of parallel to serial converter 218. The output of parallel to serial converter 218 is provided to serial connections 220 of first connector 214.

First connector 214 is adapted to mate with mating connections of various cable connectors such as 222 or 224. Such cable connectors may be adapted to have mating connections for either the serial or parallel ports. A pair of cables are provided with each mating connector. At the opposite end of each pair of cables there is a connector which is adapted to connect to a specific type of video game apparatus, such as the serial ports of a commercially available Nintendo entertainment system or to the parellel ports of commercially available Atari, Sega or Commodore video game apparatus. The names Nintendo, Atari, Sega and Commodore are trademarks of the respective companies which may be federally registered.

Referring more specifically to cable connector 222, cable connector 222 is provided with a connector 226 which may preferably be a 25-pin D-subminiature connector which mates with, in a preferred embodiment, a 25-pin D-subminiature connector 214. The two cables 228 and 230 have their wires connected to a subset of connections which mate with the connecting elements 220 of connector 214 which are connected to the serial outputs of parallel to serial converter 218. In the specific embodiment illustrated by cable connector 222 in FIG. 7, the wires of the two 5-conductor cables 228 and 230 are connected to 10 connection elements (pins or female connector, but pins are illustrated as preferred) of connector 226 and to two 7-pin connectors 232 and 234 of a type currently utilized with the Nintendo entertainment system. In this manner, the output of receiver 40 may be connected directly to the Nintendo video game apparatus which utilizes a serial signal format.

In a like manner, by the use of cable connector 224, the output of receiver 40 may be connected directly to video game apparatus which utilizes a parallel format signal input such as the Atari, Sega and Commodore video game systems. Referring more specifically to the connector cable apparatus 224, there is shown a connector 236 in which the wires of cables 238 and 240 are connected to the connector elements (pins or female receptacles, but pins are illustrated as preferred) of connector 236 which mate with the parallel connected elements 212 (female receptacles or pins, but female receptacles are illustrated as preferred) of connector 214 which are connected to the parallel output 210 of decoder 58. As illustrated in cable connector 224, the 9 wires of cables 238 and 240 are connected at their other end to 9-pin connectors 242 and 244, respectively, which are adapted to connect to currently available Atari, Sega and Commodore video game apparatus. As presently preferred, connectors 242 and 244 have female receptacles to mate with the pins presently on video game apparatus such as the Sega entertainment system. In certain cases, connections may be made such that a common connector element (pin or female receptacle) for DC voltage supply and ground may be common whether a serial or parallel signal format is utilized. Also, throughout it is understood that connector 214 may be provided with pins or female receptacles and connector 226 may be provided with the mating component, that is if connector 214 is provided with female receptacles, connectors 226 and 236 would be provided with pins. Of course, it is understood by those skilled in the art that such male-female components may be readily interchanged. In general, the same applies with respect to connectors 232, 234, 242 and 244. However, in a presently preferred embodiment, connectors 232 and 234 would be selected to properly mate with the currently existing Nintendo video game entertainment apparatus inputs. In a like manner, the connectors 242 and 244, in a presently preferred embodiment, would be selected to properly mate with the video game apparatus inputs of Atari, Sega and Commodore video game systems.

In view of the above, the present invention may be embodied in other specific forms without departing from the spirit or essential attributes thereof and, accordingly, reference should be made to the appended claims, rather than to the foregoing specification as indicating the scope of the invention.

We claim:

1. Joystick controller apparatus for video games and the like, comprising:
    a first manually operable control apparatus including a directionally operable joystick switch means and at least one additional switch, for providing signal information means for transmitting a first signal of infrared light energy on a modulated carrier of a predetermined frequency to include an address signal for said first manually operable control apparatus and signal information from said directionally operable joystick switch means and said at least one additional switch, said first signal having a duration of T0 and a repetition period of T1;
    a second manually operable control apparatus including a second directionally operable joystick switch means and at least one additional second switch for providing signal information means for transmitting a second signal of infrared light energy on a modulated carrier of said same predetermined frequency to include an address signal for said second manually operable control apparatus and signal information from said second directionally operable joystick switch means and said at least one additional second switch, said second signal having a duration substantially equal to T0 and a repetition period of T2, said T2 being selected to be at least two T0 greater than T1, at least 4 times greater than T0 and less than 16.6 milliseconds; and
    receiver means for receiving infrared light energy signals having said modulated carrier of said predetermined frequency and detecting the modulation thereon, said receiver means including means for decoding said first and second signals and separating them by address and means for providing separate control signals by means of wire connections to a video game.

2. Joystick controller apparatus in accordance with claim 19 wherein said first and second manually operable control apparatus may be operated simultaneously and independently.

3. Joystick controller apparatus in accordance with claim 19 wherein said infrared light energy signals have modulated carrier frequencies selected to be approximately 40 KHz.

4. Joystick controller apparatus in accordance with claim 19 wherein each of said first and second manually operable control apparatus is provided with a directionally operable joystick switch means in the form of a pivotable stick adapted to be pivoted to a limited degree selectively in 360°.

5. Joystick controller apparatus in accordance with claim 4 wherein each of said first and second manually operable control apparatus is provided with a directionally operable joystick switch means which is provided with four switches, one of said four switches being operated when said stick is moved in the direction of a 90° quadrant of said 360°.

6. Joystick controller apparatus in accordance with claim 19 wherein each of said first and second manually operable control apparatus is provided with two additional activation or fire switches.

7. Joystick controller apparatus in accordance with claim 19 wherein said first and second manually operable control apparatus continuously transmit on said frequency at their respective repetition periods of T1 and T2.

8. Joystick controller apparatus in accordance with claim 19 wherein the sensitivity of said receiver means is adjusted such that it is adjusted to receive reflected signals where said joystick controller apparatus is utilized in an enclosed space.

9. Joystick controller apparatus in accordance with claim 19 wherein both said first signal transmitting means includes means for modulating said first signal to provide a transition approximately at the center of each data bit, said second signal transmitting means includes means for modulating said second signal to provide a transition approximately at the center of each data bit and said receiver means includes means for detecting the presence or absence of said transition to provide an error detection function.

10. Joystick controller apparatus in accordance with claim 9 wherein said modulating means for said first and second signal transmitting means modulates a logic "1" data bit by a "1" to "0" transition at the center of the data bit and modulates a logic "0" by a "0" to "1" transition.

11. Joystick controller apparatus in accordance with claim 19 wherein said means for providing separate control signals by means of wire connections to a video game includes a first connector means with a plurality of connections for receiving parallel signal and a plurality of connections for receiving serial signal, said decoding means including a parallel output, said output of said decoding means being provided to said plurality of connections for receiving parallel signal and to a parallel to serial converter means for providing serial output signal to said plurality of connections, for receiving serial signal said first connector means being adapted to receive a mating connector having a pair of cables connected thereto containing wires, the wires of said cables being connected to connections corresponding to either said serial or parallel connections of said first connector means, each of said cables being provided at the opposite ends thereof with second connector means for connecting to the input of a video game apparatus.

12. Joystick controller apparatus in accordance with claim 11 wherein said first connector means and its mating connector are comprised of a 25-pin D-subminiature connector.

13. Joystick controller apparatus in accordance with claim 11 wherein said plurality of connections of said first connector means for receiving parallel signal are comprised of 18 connections.

14. Joystick controller apparatus in accordance with claim 11 wherein said plurality of connections for receiving serial signal of said first connector means are comprised of 10 connections.

15. A connection system for connecting the output of a joystick controller or like apparatus to the input of a video game apparatus, comprising:
   a first connector means with a plurality of connections for receiving parallel signal and a plurality of connections for receiving serial signal;
   signal generating means for generating a signal including means for providing a parallel signal to said plurality of connections for receiving parallel signal and a serial signal to said plurality of connections for receiving serial signal; and
   mating connection means including a pair of cables containing wires, said wires of said pair of cables being connected to connections corresponding to either said serial or parallel connections of said first connector means, each of said cables being provided at the opposite ends thereof with connection means for connecting to the input of a video game apparatus.

16. A connection system for connecting the output of a joystick controller or like apparatus to the input of a video game apparatus in accordance with claim 15 wherein said first connector means and its mating connector are comprised of a 25-pin D-subminiature connector.

17. A connection system for connecting the output of a joystick controller or like apparatus to the input of a video game apparatus in accordance with claim 15 wherein said plurality of connections of said first connector means for receiving parallel signal are comprised of 18 connections.

18. A connection system for connecting the output of a joystick controller or like apparatus to the input of a video game apparatus in accordance with claim 15 wherein said plurality of connections for receiving serial signal of said first connector means are comprised of 10 connections.

* * * * *

UNITED STATES PATENT AND TRADEMARK OFFICE
CERTIFICATE OF CORRECTION

PATENT NO. : 4,924,216
DATED : May 8, 1990
INVENTOR(S) : Albert M. Leung

It is certified that error appears in the above-identified patent and that said Letters Patent is hereby corrected as shown below:

Claim 1, line 5, after "switch", delete ",".

Claim 1, line 6, after "information", insert --,--.

Claim 1, line 17, after "information", insert --,--.

Signed and Sealed this

Twentieth Day of August, 1991

Attest:

HARRY F. MANBECK, JR.

*Attesting Officer*      *Commissioner of Patents and Trademarks*